United States Patent [19]

Primus

[11] 4,142,302
[45] Mar. 6, 1979

[54] MULTIPLE BIN HEAT RECYCLED GRAIN DRYING

[76] Inventor: David R. Primus, Mt. Auburn, Iowa 52313

[21] Appl. No.: 778,033

[22] Filed: Mar. 16, 1977

[51] Int. Cl.² .............................................. F26B 3/06
[52] U.S. Cl. ........................................ 34/31; 34/66; 34/181; 34/212; 34/216; 34/225; 432/82
[58] Field of Search .................... 432/82, 500; 34/225, 34/233, 210, 212, 215, 216, 217, 62, 64, 65, 66, 67, 168, 181, 29, 31, 13

[56] References Cited

U.S. PATENT DOCUMENTS

| 707,323 | 8/1902 | Hess, Jr. | 34/65 |
|---|---|---|---|
| 1,028,899 | 6/1912 | Morris | 34/65 |
| 1,127,974 | 2/1915 | Ellis | 34/65 |
| 1,151,268 | 8/1915 | Hess | 34/65 |
| 2,000,103 | 5/1935 | Shodron | 34/225 |
| 2,245,664 | 6/1941 | Gronert | 34/65 |
| 2,641,063 | 6/1953 | Greiman | 34/102 |
| 2,863,225 | 12/1958 | Prussing et al. | 34/66 |
| 3,158,448 | 11/1964 | Wallin et al. | 34/233 |
| 3,380,174 | 4/1968 | McClaren | 34/56 |
| 3,687,170 | 8/1972 | Malone | 138/143 |
| 4,006,536 | 2/1977 | Meiners | 34/212 |
| 4,045,882 | 9/1977 | Buffington | 34/216 |

Primary Examiner—John J. Camby
Assistant Examiner—Larry I. Schwartz
Attorney, Agent, or Firm—Zarley, McKee, Thomte, Voorhees and Sease

[57] ABSTRACT

An improvement in the method of grain drying wherein grain is dried in a first drying bin and removed to a holding bin, the improvement comprising withdrawing hot air from the holding bin and circulating the hot air to the drying bin.

10 Claims, 2 Drawing Figures

MULTIPLE BIN HEAT RECYCLED GRAIN DRYING

BACKGROUND OF THE INVENTION

This invention relates to an improvement in grain drying methods.

Grains and corn in particular, that is either too wet or too dry, does not have the sales value or feed value of corn that has a correct and desired moisture content. Thus, corn which is too wet will represent a direct financial loss to the farmer. In addition, corn which is too wet is subject to more spoilage and the potential for mold growth than is dryer corn.

Corn as it is harvested typically will have a moisture content from 20% to 25%. As explained earlier, this corn must be dried, typically to a moisture within the range of 13% to about 17% by weight prior to sale. If the farmer fails to dry the corn he will be docked in the price at the time of the sale. As a result of both the financial factor of selling high moisture grain as well as the spoilage factor, most grain producers dry the grain prior to storage or sale. In a typical drying operation, that is bin-drying, the bin is first loaded with the high moisture grain and thereafter heated air is supplied to the interior of the bin through a ventilated floor and flows upward through the grain. In some instances, and for the purpose of facilitating the flow of air through the grain, a perforated tube at the center of the bin is extended upwardly through the grain. In addition, the sidewalls of the bin may be of a perforated construction. Finally, in order to maximize the drying efficiency of the heated air which is moved upwardly through the bin (the air typically is heated by a liquid propane burner), the grain is oftentimes circulated through the bins by use of grain circulating augers. The value of the grain circulating system is that it prevents hot air scorching of the grain most near the heaters, and it allows the grain more remotely spaced from the heaters to be effectively subjected to hot air. As a result, a more uniform moisture content dried grain is obtained. For typical examples of bin drying stored grain, see Shivvers, U.S. Pat. Nos. 3,563,399, 3,765,547, and 3,765,548.

An improvement on the bin grain drying system includes circulating the grain through the drying bin and thereafter transferring the grain via an outlet at the top of the bin to grain storage bins, referred to herein as holding bins. This invention relates to an improvement in the "double bin" drying system. The term "double bin" drying system as used herein, is intended to mean where a first bin is employed with heaters for heating and drying a grain such as corn, and the corn product which has achieved the desired moisture content is thereafter removed and conveyed to a holding bin for storage.

As a result of the employment of the grain drying system of the present invention, fuel costs can be substantially reduced, as much as 40% to 50%, and the problems of clogging forced air fans with "bee's wings" or in other words, corn chaff, are obviated.

The method of accomplishing the advantages of this invention i.e., substantially decreased fuel costs for grain drying and elimination of problems associated with corn chaff clogging forced air fans, are obviated by the method of this invention.

Heretofore, the particularly in grain drying systems which involve circulation of the grain within a drying bin, only limited success has been achieved with recirculation of hot air within the grain drying bin in order to more effectively and efficiently utilize the hot air from the propane burners. The reason for such limited success is that as the grain is continually moved within the drying bin, corn chaff is disengaged from the kernel. This corn chaff, commonly referred to as "bee's wings", is segregated from the kernels because of its light weight and is drawn with a forced air recircultion fan back to the burner along with recycle hot air. As a result, such bee's wings often accumulated in piles and either clog the forced air fan or if exposed to the flames of the burner, will burn and cause fires. As a result, complex filter systems had to be utilized, or hot air recirculation had to be abandoned.

In the grain drying system of the present invention, the problem of bee's wings interfering with hot air recirculation has been obviated since the hot corn itself in a holding bin, after transfer from the drying bin, acts as a filter to effectively prevent bee's wings transfer back to the grain drying bin along with recycled hot air.

The manner of achieving the advantages of the invention, as well as other objects of the invention will be discussed hereinafter, will become apparent from the detailed description of the invention which follows.

SUMMARY OF THE INVENTION

This invention relates to an improvement to double bin grain drying systems. In accordance with the invention, a grain, typically corn, is heated in a grain drying bin to temperatures as high as 180° F. or higher. The grain is continually circulated through the grain drying bin and subjected to such hot air temperatures until the moisture content is driven downward from the range of 20% to 25% to the desired range of 13% to 17%. Thereafter, the dried grain is removed from the grain drying bin and transferred to a holding bin. Since the grain is hot in the holding bin, and it warms the air within the holding bin, hot air is withdrawn from the holding bin and recycled back to the drying bin. The result is greater fuel efficiency and the dried grain itself is used as a filtering system to prevent clogging of the drying system with bee's wings.

DETAILED DESCRIPTION OF THE INVENTION

Figure 1:
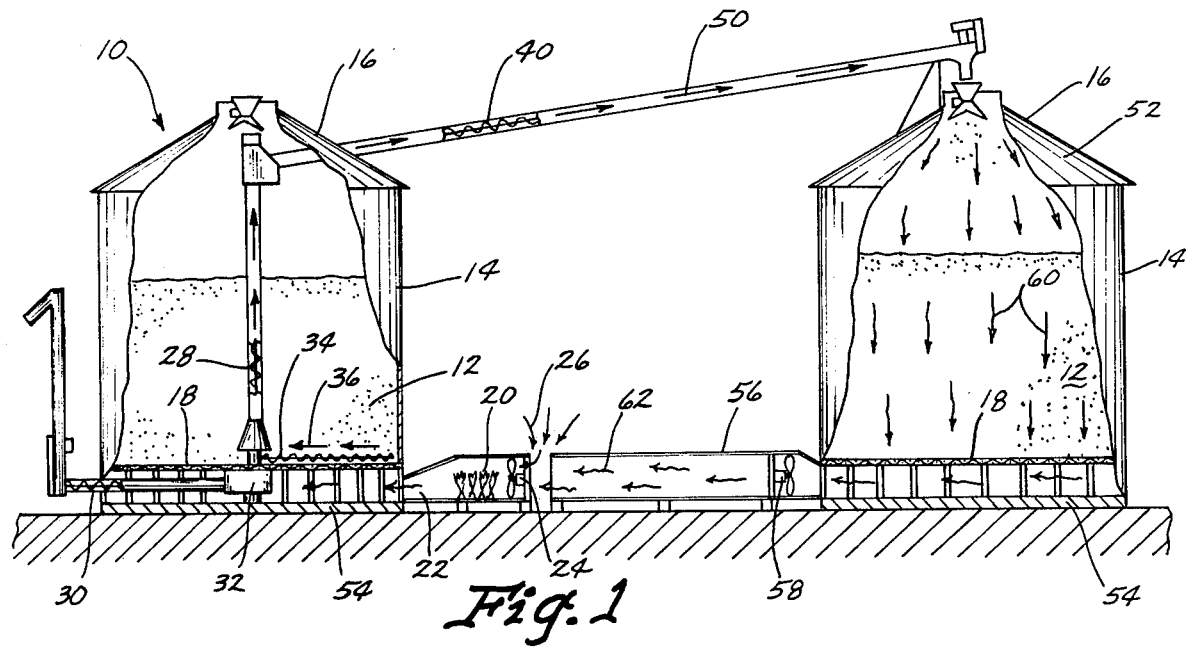
FIG. 1 is a schematic representation showing the overall grain drying system of this invention which employs a single grain drying bin and a single grain holding bin.
Figure 2:
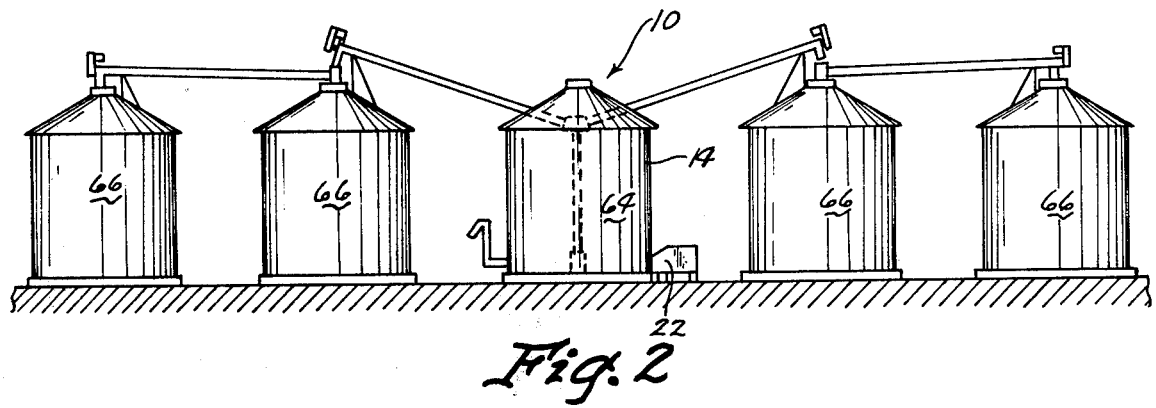
FIG. 2 of this invention shows how the system of this invention may be applied to a plurality of bins wherein a single grain drying bin services many holding bins.

It is to be understood that the schematic drawings represented in FIGS. 1 and 2 are shown for representative purposes only. The double bin grain drying system being shown there is one of only many with which this invention may be applied, the critical factor being that the grain drying system involves at least one drying bin and at least one grain holding bin. Of course, there must be communication between the grain drying bin and the grain holding bin in order to transfer the grain from one to the other via augers or the like. In addition, the transfer of the grain may be via a transfer auger as depicted showing transfer from the top of one bin to the top of the other or alternatively, transfer may be made from the bottom of one bin to the other or in any other convenient manner, this not being a critical part of the invention. However, for purposes of convenience of description only, the invention will be described in connection with the auger conveying transfer system shown in the schematic drawings as transfer from the top of one bin to another.

In FIG. 1 a grain drying bin 10 is shown with certain parts broken away. The bin is filled with a grain 12 which is to be dried. Typically grain 12 is corn, having a moisture content within the range of from about 20% to about 25% by weight. Bin 10 comprised of circular side wall 14, roof 16, and ventiled floor 18. Ventilated floor 18 forms a false bottom for the bin and positioned underneath ventilated floor 18 in a plenum chamber or space is propane burner 20. Duct 22 is in communication with propane burner 20 and has positioned therein forced air fan 24. Typically forced air fan 24 is operated by a motor such as a 10 horsepower motor which is not depicted. When forced air fan 24 is operating, it pulls air from the outside atmosphere as indicated via arrow 26 into duct 22 in order to supply oxygen to propane burner 20. Hot air from propane burner 20 communicates with the interior of drying bin 10 through the ventilated floor 18 of the drying bin 10.

As depicted in FIG. 1, the grain drying bin has a central vertical auger 28 and an underbin auger 30 both in communication with a motor and gear box depicted at 32. In addition, a sweep auger 34 is also in communication with gear box 32 and vertical auger 28. Sweep auger 34 is powered so that it will travel in a radially moving manner around the bottom travels 18 of drying bin 10. As sweep auger 34 traveles radially around the bottom floor 18 of the bin, grain is conveyed inwardly towards the center of the bin in a manner depicted by arrow 36. As the grain reaches the central portion of the bin, it is picked up by a vertical auger 28 and transferred to the top portion of the bin. The grain once again then travels downwardly as sweep auger 34 continually removes grain from the bottom towards the pickup for vertical auger 28. In this manner the grain is circularly moved from the top portion of the bin to the bottom, then inwardly and then upwardly to the top portion again. In this manner, while propane burner 20 and forced air fan 24 are continually being operated, the grain is subjected to temperatures typically within the range of 160° F. to 180° F. and the grain eventually is dried to moisture contents within the range of 13% to 17% by weight. After the grain has been dried, it must be removed from drying bin 10 before it is scorched. Removal may be accomplished by removal from the bottom via underbin auger 30 or by connecting transfer auger 40 to vertical auger 28. For purposes of clarity of description, it will be assumed that transfer auger 40 is employed.

The dried grain having the desired moisture content is transferred via transfer auger 40 through the top of drying bin 10 as indicated via arrows 50 to holding bin 52. Since holding bin 52 is of like construction to drying bin 10, like numerals are applied and will not be repeated herein.

During the transfer of grain from drying bin 10 to holding bin 52, the corn chaff is also transferred therewith. The grain 12 falling into bin 52 is considerably hotter than the ambient air. In fact, the grain typically will have a temperature within the range of 90° F. to about 110° F. When bin 52 is filled with grain as depicted in FIG. 1, the air temperature within holding bin 52 rises considerably to within the above described range.

As shown in FIG. 1, bin 52, as does drying bin 10, has a ventilated false floor 18. In communication with the chamber defined by the bottom floor or foundation 54 and false floor 18 is a hot air transfer duct 56. Positioned in hot air transfer duct 56 is a forced air fan 58. Typically, fan 58 is operated by a one horsepower motor. For reasons described hereinafter, it is important that fan 58 be of a smaller horsepower than fan 24. When fan 58 is operating, it pulls air as indicated by arrows 60 through the grain 12 in holding bin 52. Since the grain is hot, the heat is transferred to the air and the air pulled into hot air transfer duct 56 is at a temperature within the range of 90° F. to 110° F. The air in hot air transfer duct 56 is moved as indicated via arrow 62 through hot air transfer duct 56. Hot air transfer duct 56 terminates at the entrance to air duct 22 which is in communication with propane burner 20 and via ventilator floor 18 with the interior of drying bin 10.

It is important to note, as seen in FIG. 1, that heat transfer duct 56 is not in sealing communication with duct 22. This is because it has been found important for the process of this invention that fan 24 draw into duct 22 not only the heated air from holding bin 52, but also additional amounts of ambient air as indicated via arrow 26. This is so because the amount of air drawn through the grain 12 in bin 52 is an insufficient supply of air for efficient burning of propane burner 20. Thus, from a construction standpoint, hot air transfer duct 56 must either be of a smaller diameter than duct 22 in which case it may actually enter into the exterior opening of duct 22, or if the same size, it should terminate prior to the opening into duct 22 in order to allow for a gap positioned between the exit from hot air transfer duct 56 and the entrance to air duct 22. Preferably hot air duct 56 is of a smaller diameter and extends inwardly into duct 22 so that there is an annular space defined by the exterior wall of hot air transfer duct 56 and the interior wall of duct 22 to allow air to enter duct 22 from the atmosphere as indicated by arrow 26.

As can be seen in FIG. 1, during the operation of the drying process of this invention, hot air as depicted via arrows 60 is pulled via fan 58 through grain 12 in holding bin 52. Bee's wings are prevented from transfer since the grain in holding bin 52 is in a static position and the grain itself acts as a filter preventing bee's wings from being transferred through the grain along with hot air. The air which has been warmed by the hot grain in bin 52 is at a temperature within the range of 90° F. to 110° F. and is transferred through hot air duct 56 as indicated via arrow 62. The heated air is pulled via fan 24 into the entrance of duct 22 and from there to the propane burner 20. However, since the air is already at a temperature within the range of 90° F. to 100° F., it being warmed to this temperature by the hot grain in bin 52, considerably less fuel need be expended to increase the temperature of this air to typical drying temperatures within the range of 160° F. to 180° F. or even higher. As a result, the amount of fuel consumed is considerably less. In addition, bee's wings are prevented from entering into burner 20 and fan 24 via the filtering effect of the static hot corn in holding bin 52.

FIG. 2 shows how the double bin hot air drying system employing recirculated hot air might be employed using a single hot air drying bin 64 and a plurality of holding bins 66. The appropriate duct work is not shown in FIG. 2, but it is to be understood that each of bins 62, which are of a configuration as depicted for bin 52, have a hot air transfer duct in associative relationship with duct 22 as described previously in connection with FIG. 1.

EXAMPLE

In an effort to determine the improved efficiency of the bin drying which employed hot air recirculation as previously described herein, the system was employed both with and without hot air recirculation. When the double bin drying system was employed without hot air circulation, the grain used in the drying bin 16 varied in moisture content from 14% to 26% as it entered into drying bin 10. The total number of bushels of grain dried in bin 10 was 10,000 bushels. The cost of liquid propane fuel necessary to dry this grain to a moisture content of about 13½% to 15½% was $496.58. This gave a net cost per bushel of fuel of five cents.

In another attempt wherein 13,000 bushels of corn was dried within the corn varying from initial moisture contents within the range of 20% to 22%, the cost of the liquid propane fuel was $350. The grain was dried to a moisture content within the range of 13½% to 15½% and recirculation of hot air temperatures within the range of 90° F. to 110° F. as previously described herein, was practiced. The cost per bushel of corn for the liquid propane fuel necessary to arrive at the moisture content was 2.7 cents. As can be seen, when hot air recirculation was employed, more grain was dried at a considerable less cost per bushel than when it was not employed. Moreover, there was no problem involving bee's wings, either catching fire in burner 20 or of bee's wings clogging either fan 58 or fan 24. The grain in holding bin 52 acted as a filter to prevent bee's wings from transferring into hot air transfer duct 56.

In accordance with the preferred embodiment of this invention, it has been found preferable that hot air transfer duct 56 be comprised of galvanized tubing having an insulative material surrounding the inside thereof. This prevents the tubing from sweating and prevents heat loss by heat transfer through the tubing 56 to the exterior atmosphere.

As can be seen, the invention accomplishes at least all of its stated advantages and objectives. It is, of course, to be understood that certain modifications may be made in the general manner of depicting the double bin drying system without departing from the spirit and scope of the invention herein which involves the hot air recirculation to the interior chamber of the drying bin, with the hot air being filtered through stationary hot corn in a separate and distinct holding bin.

What is claimed is:

1. A method of grain drying which comprises,
   heating a grain in a separate grain drying bin to provide dry grain, while continuously moving the dry grain in said drying bin,
   continuously removing in a manner which avoids substantial heat loss, dried but still hot grain from said drying bin,
   placing said hot grain in a static position in a separate holding bin to act as a grain filter, said holding bin containing atmospheric air which is warmed by said hot dried grain,
   removing through said static dried grain atmospheric air from said holding bin, and
   passing said hot atmospheric air which is substantially free from chaff and other grain particles, into said drying bin.

2. The method of claim 1 wherein said hot air is passed from a plurality of holding bins to a single drying bin.

3. The method of claim 1 wherein said grain drying bin has an air entrance duct and said grain holding bin has an air exit duct, said air exit duct of said grain holding bin being positioned with respect to said air entracne duct of said grain drying bin so that air withdrawn from said holding bin and ambient air as well may both be drawn into said drying bin air entrance duct.

4. The process of claim 1 wherein the grain conveyed from said drying bin is the hottest and most dry grain in said bin.

5. In the method of grain drying wherein grain is dried in a first drying bin and removed in a manner to prevent substantial heat loss to a separate holding bin, wherein said hot grain warms atmospheric air in said holding bin, the improvement comprising withdrawing hot atmospheric air from said holding bin, through stationary grain in said bin so that said grain acts as a filter to prevent simultaneous withdrawal of corn chaff, and passing said chaff free hot atmospheric air into said drying bin.

6. The method of claim 5 wherein said recirculated hot air is at a temperature within the range of 90° F. to about 110° F.

7. The method of claim 5 wherein said hot atmospheric air is passed from a plurality of holding bins.

8. The method of claim 5 wherein said grain drying bin has an air entrance duct and said grain holding bin has an air exit duct, said air exit duct of said grain holding bin being positioned with respect to said air entrance duct of said grain drying bin so that air withdrawn from said grain holding bin and ambient air as well may both be drawn into said drying bin air entrance duct.

9. The method of claim 8 wherein said air exit duct of said grain holding bin is galvanized tubing having an insulative material surrounding the interior surface thereof.

10. The process of claim 5 wherein the grain conveyed from said drying bin is the hottest and most dry grain in said bin.

* * * * *